United States Patent
Rehman et al.

(10) Patent No.: US 10,057,803 B2
(45) Date of Patent: Aug. 21, 2018

(54) WI-FI ADOPTION INDEX

(71) Applicant: Aruba Networks, Inc., Sunnyvale, CA (US)

(72) Inventors: Ataur Rehman, Rasra (IN); Manaswini Lakshmikanth Sugatoor, Bangalore (IN); Pradeep Iyer, San Jose, CA (US); Gopal Agarwal, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 75 days.

(21) Appl. No.: 15/338,114

(22) Filed: Oct. 28, 2016

(65) Prior Publication Data
US 2018/0124620 A1    May 3, 2018

(51) Int. Cl.
*H04L 12/26* (2006.01)
*H04W 24/10* (2009.01)
*H04W 84/12* (2009.01)

(52) U.S. Cl.
CPC ......... *H04W 24/10* (2013.01); *H04L 43/0876* (2013.01); *H04L 43/18* (2013.01); *H04W 84/12* (2013.01)

(58) Field of Classification Search
CPC ..... H04W 24/10; H04L 43/0876; H04L 43/18
See application file for complete search history.

(56) References Cited

U.S. PATENT DOCUMENTS

| | | | |
|---|---|---|---|
| 8,570,993 B2* | 10/2013 | Austin | H04W 4/02 370/338 |
| 2010/0031012 A1 | 2/2010 | Rotondo et al. | |
| 2010/0322214 A1* | 12/2010 | Workman | H04W 4/029 370/338 |
| 2012/0254624 A1 | 10/2012 | Malkhasyan et al. | |

(Continued)

FOREIGN PATENT DOCUMENTS

EP    2490145 A1    8/2012

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE USA.

(Continued)

*Primary Examiner* — Sai Ming Chan
(74) *Attorney, Agent, or Firm* — Brooks, Cameron & Huebsch, PLLC

(57) ABSTRACT

In some examples, a non-transitory computer-readable medium may contain instructions executable by a processing resource to collect Wi-Fi data points. The Wi-Fi data points may correspond to a plurality of users of an enterprise for a particular number of days. In some examples, the Wi-Fi data points may indicate a time period during each of the particular number of days when each of the plurality of users was connected to a Wi-Fi network. Instructions may further be executable to determine that a subset of the Wi-Fi data points represent outliers and remove the subset of Wi-Fi data points to create a data set. The data set may comprise (Continued)

non-outlier Wi-Fi data points. Instructions may further be executable to determine a Wi-Fi Adoption Index (WAI) for each of the plurality of users based on the data set.

15 Claims, 5 Drawing Sheets

(56) References Cited

U.S. PATENT DOCUMENTS

| | | | | |
|---|---|---|---|---|
| 2014/0068212 | A1* | 3/2014 | Lin | H04M 15/58 |
| | | | | 711/162 |
| 2014/0143408 | A1 | 5/2014 | Workman et al. | |
| 2015/0098387 | A1 | 4/2015 | Garg et al. | |
| 2017/0373959 | A1* | 12/2017 | Zalmanovitch | H04W 4/003 |

OTHER PUBLICATIONS

W-Fi Alliance, "Wi-Fi Peer-to-Peer (P2P) Technical Spec. V. 1.5", Aug. 4, 2014, 13 pages, WiFi Alliance, USA.

Wi-Fi Alliance, "Wi-Fi Certified Wi-Fi Direct: Personal, portable Wi-Fi to connect devices anywhere, anytime", Sep. 2014, 8 pages, WiFi Affiance, USA.

IEEE Computer Society, "IEEE Standard for Air Interface for Broadband Wireless Access Systems; IEE Std 802.16-2012", Aug. 17, 2012, 3 pages, IEEE, USA.

Bluetooth, "Specification of the Bluetooth System", Dec. 2, 2014, 3 pages, Covered Core Package version 4.2, Bluetooth SIG Inc., USA.

IEEE Computer Society, "IEEE Standard for Local and Metropolitan Area Networks: Overview and Architecture; IEEE Std 802-2014", Jun. 12, 2014, 18 pages, IEEE, USA.

Wikipedia, https://en.wikipedia.org/wiki/Internet_Protocol "Internet Protocol", Jan. 1, 2015, 6 pages, Wikipedia, USA.

USB Technology, http://www.usb.org/developers/docs/, "USB 3.1 Specification", Jul. 26, 2013, 37 pages, USB Implementers Forum Inc, USA.

Wikipedia, https://en.wikipedia.org/wiki/Asynchronous_Transfer_Mode, "Asynchronous Transfer Mode", Dec. 31, 2014, 11 pages, Wikipedia, USA.

* cited by examiner

WI-FI ADOPTION INDEX

BACKGROUND

Enterprises may use a wireless infrastructure, such as a Wi-Fi network, to provide network connectivity to users, such as employees or visitors. Network connectivity through a Wi-Fi network may increase the productivity of the enterprise and/or the users of the network.

DETAILED DESCRIPTION

Wireless infrastructures, such as Wi-Fi networks, may be used to provide wireless access. However, it may be difficult to determine how well a Wi-Fi network has been adopted by a user and/or by a provider. As used herein, adopting a Wi-Fi network refers to how the Wi-Fi network is used. For example, Wi-Fi adoption may consider how a user or plurality of users are using the Wi-Fi network, whether the Wi-Fi network is providing enough bandwidth to support users, and/or how the Wi-Fi network is associated with productivity of users. In some examples, Wi-Fi adoption may be determined by considering a pattern of usage pertaining to a single user or pertaining to a Wi-Fi network provider. However, patterns may include outliers that tend to skew data or may lack precision, also skewing data.

In contrast, according to the present disclosure, Wi-Fi usage may be tracked within an enterprise to help determine how well a Wi-Fi network is adopted by an enterprise. As used herein, an enterprise refers to an organization. For example, an enterprise may be a business or company, a school, or a home, among other examples. In some examples, the Wi-Fi usage of the enterprise may be analyzed to determine how effectively the enterprise has adopted Wi-Fi. As used herein, to effectively adopt Wi-Fi refers to an adoption of Wi-Fi that comports with its intended use. For example, effective adoption of Wi-Fi in an enterprise may lead to increased productivity among Wi-Fi users. In other examples, effective adoption of Wi-Fi may be reflected by increased amounts of time spent connected to the Wi-Fi network, indicating that the Wi-Fi network is providing sufficient bandwidth for a user's activities. Additionally, Wi-Fi usage of a single enterprise may be compared against Wi-Fi usage of similar enterprises. This may assist an enterprise in learning how effectively it has adopted Wi-Fi in comparison to similar enterprises.

Wi-Fi usage may also be tracked with respect to individual users within an enterprise, according to the present disclosure. In some examples, the Wi-Fi usage of an individual user may be analyzed to determine how effectively the user has adopted Wi-Fi. Wi-Fi adoption of the single user may be compared to Wi-Fi adoption of additional users within the enterprise to determine how effectively the single user has adopted Wi-Fi in comparison to other users.

Figure 1:
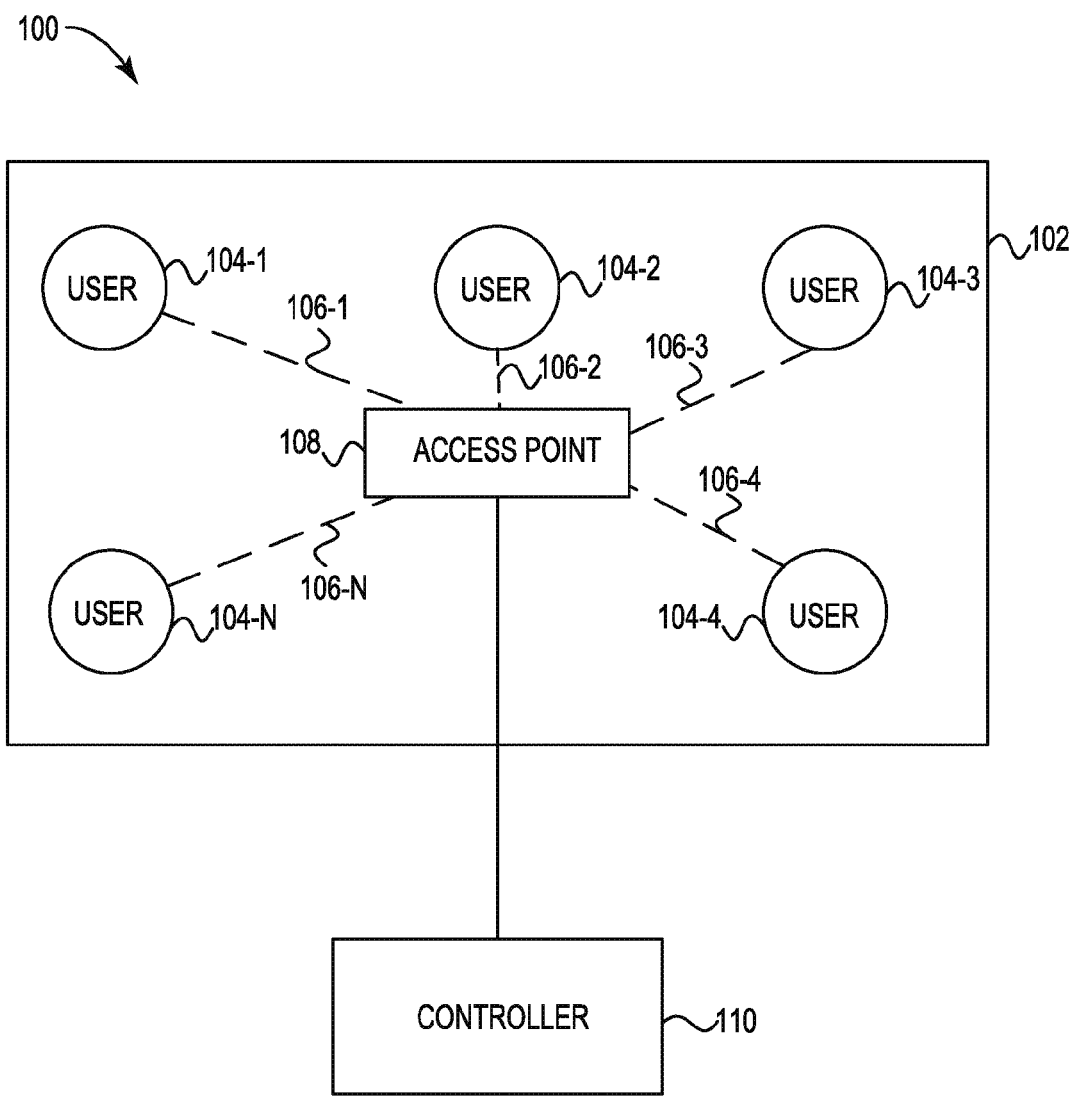
FIG. 1 illustrates an example of an environment for a Wi-Fi adoption index according to the disclosure.

FIG. 1 is an example of an environment 100 for a Wi-Fi adoption index according to the present disclosures. Environment 100 may include an enterprise 102. As described previously, an enterprise refers to an organization. Enterprise 102 may provide a Wi-Fi network.

Users 104-1, 104-2, 104-3, 104-4 . . . 104-N (collectively referred to herein as users 104) may be located within enterprise 102, as shown in FIG. 1. As used herein, a user refers to a person who accesses the internet using a Wi-Fi network. Users 104 may be connected via connections 106-1, 106-2, 106-3, 106-4 . . . 106-N (collectively referred to herein as connections 106) to access point 108. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards, shown in FIG. 1 by connections 106.

Users 104 may connect to AP 108 via connections 106. When a user 104 connects to AP 108, AP 108 may note the time at which the user 104 connects. Access point 108 may then monitor a length of time that the user 104 is connected to the Wi-Fi network and note the time at which the user disconnects. Said differently, AP 108 may determine when a user 104 initially connects with the Wi-Fi network and when the user 104 disconnects from the Wi-Fi network, and determine a length of time connected based on the connection and disconnection times.

Access point 108 may transmit the information corresponding to a connection time of a user 104 to a controller 110. As used herein, a controller refers to hardware to manage and/or monitor an AP. A controller may be able to control automatic adjustments of power, channels, authentication, and/or security of the AP. As shown in FIG. 1, controller 110 may be located outside enterprise 102, although examples are not so limited. Controller 110 may receive the connection information for a user 104 from AP 108 and use the information to determine a Wi-Fi Adoption Index (WAI). Further discussion of the determination of a WAI is presented herein with regards to FIG. 2-5.

Figure 2:
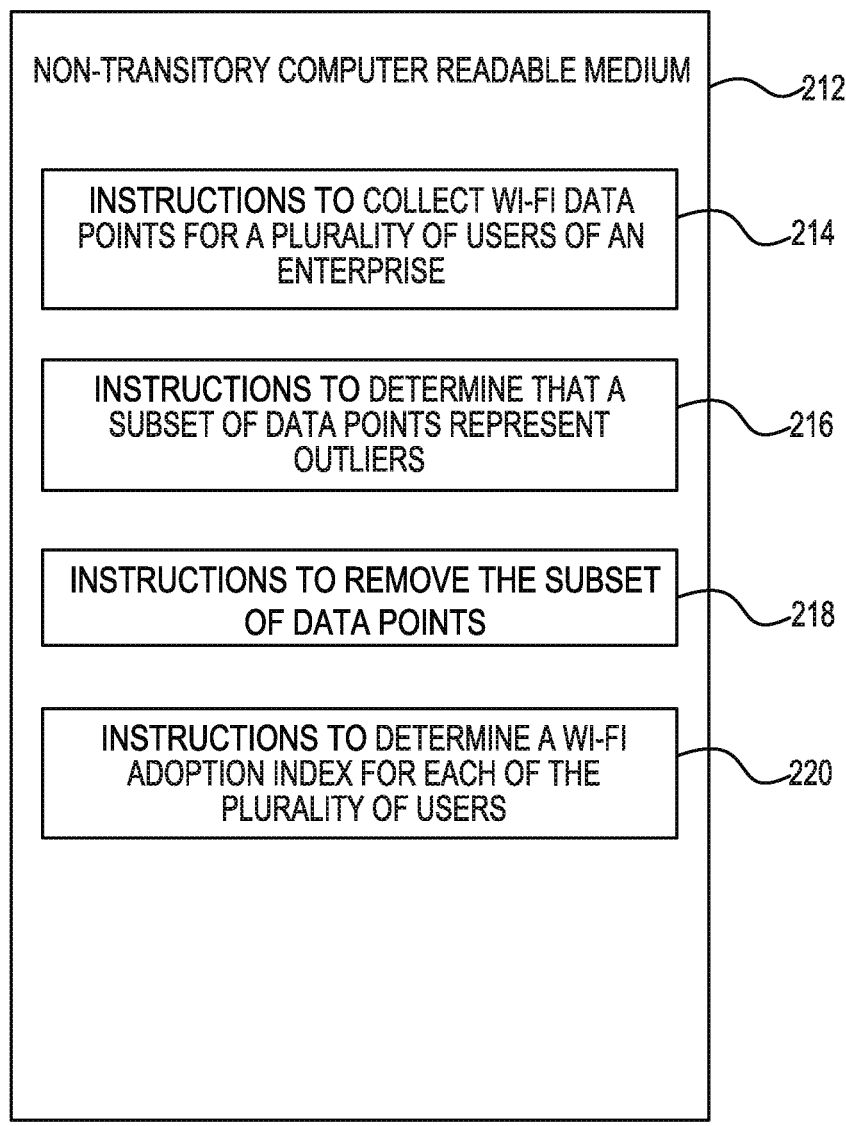
FIG. 2 illustrates example of a medium for a Wi-Fi adoption index according to the disclosure.

FIG. 2 is an example of a medium 212 for a Wi-Fi Adoption Index according to the present disclosure. As described herein, the components illustrated in FIG. 2 may perform a number of functions related to a Wi-Fi adoption index. Although the following descriptions refer to a single processing resource and a single computer readable storage medium 212, the descriptions may also apply to a system including multiple processing resources and multiple computer readable storage mediums. In such examples, the medium 212 may be distributed across multiple computer readable storage mediums and multiple processing resources. Put another way, the instructions executed in the medium 212 may be stored across multiple machine-readable storage mediums and executed across multiple processing resources, such as in a distributed or virtual computing environment.

As illustrated in FIG. 2, medium 212 may comprise a non-transitory machine-readable storage medium storing machine readable instructions to cause a processing resource (not illustrated in FIG. 1) to perform a number of operations relating to a Wi-Fi adoption index. The processing resource may be a central processing unit (CPU), microprocessor, and/or other hardware device suitable for retrieval and execution of instructions stored in machine-readable storage medium 212.

The medium 212 may include instructions 214 executable by the processing resource to collect Wi-Fi data points for a plurality of users of an enterprise. As used herein, a user refers to a person who, by means of a network device, accesses the internet using a Wi-Fi network. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells. In some examples, the Wi-Fi network may be provided by an enterprise. In some examples, an enterprise may provide users with access to a Wi-Fi network particular to that enterprise.

In some examples, instructions 214 may include instructions to determine that a user has accessed the Wi-Fi network and begin gathering data for the user. In some examples, the Wi-Fi data points may indicate a time at which a user first accessed the Wi-Fi network. In some examples, the Wi-Fi data points may indicate a time at which a user terminated access to the Wi-Fi network. The Wi-Fi data points may then subtract the time at which a user first accessed the Wi-Fi network from the time at which the user terminated access to the Wi-Fi network to determine a time of stay. As used herein, a time of stay refers to an amount of time during which a user was connected to a Wi-Fi network. Said differently, the Wi-Fi data points may indicate the length of time a user was connected to and using the Wi-Fi network.

Wi-Fi data points may further include a categorization of the time of day at which a user accessed and used the Wi-Fi network. In some examples, instructions 214 may include instructions to note what time a user first accesses the Wi-Fi network and, based on that time, categorize the corresponding Wi-Fi data points as belonging to a particular time of day. For example, instructions 214 may determine that Wi-Fi data points corresponding to a user who is accessing the Wi-Fi network at 8:00 a.m. belongs in a "morning" group, while Wi-Fi data points corresponding to a user accessing the Wi-Fi network at 8:00 p.m. belongs in an "evening" group.

The medium 212 may include instructions 216 executable by the processing resource to determine that a subset of data points represent outliers. Said differently, instructions 216 may cause the processing resource to determine that a subset of the data points collected at 214 represent deviations. For example, instructions 216 may include instructions to determine that a subset of data points fall outside of pre-defined upper and lower limits. As used herein, a limit refers to a boundary amount of a particular metric. For example, a limit according to the present disclosure could correspond to an amount of time a user was connected to a Wi-Fi network. More discussion of the determination that a subset of data points represent outliers is presented herein in relation to FIG. 3.

The medium 212 may include instructions 218 executable by the processing resource to remove the subset of data points. In some examples, instructions 218 may cause the processing resource to discard the subset of data points determined to be outliers at 216. Instructions 218 may then create a data set. As used herein, a data set refers to a collection of data. In some examples, the data set may comprise Wi-Fi data points that were not determined to be outliers at 216. Said differently, the data set may include all the non-discarded Wi-Fi data points. In some examples, a data set may comprise non-outlier Wi-Fi data points pertaining to a particular user for a period of time. For example, a data set may include Wi-Fi data points corresponding to a particular user over a period of one month.

The medium 212 may include instructions 220 executable by the processing resource to determine a Wi-Fi Adoption Index (WAI) for each of the plurality of users. In some examples, instructions 220 may cause the processing resource to determine a WAI for each of the plurality of users of an enterprise. As used herein, a WAI refers to a numerical value indicating an extent of Wi-Fi usage by an individual and/or group of individuals within an enterprise. In such a manner, the WAI for an individual may indicate an extent to which the individual has used Wi-Fi within the enterprise. Similarly, the WAI for a group of individuals may indicate an extent to which the group of individuals have used Wi-Fi within the enterprise.

In some examples, a WAI may indicate how a particular user has adopted Wi-Fi. In some examples, the WAI for a particular user may be determined based on a data set, such as the data set created at 218. A WAI may be determined by averaging the values found in the data set. For example, a set of Wi-Fi data points may show an amount of time connected to a Wi-Fi network per day for a particular user over a period of 30 days. Six data points may be determined to be outliers and removed, creating a data set comprising 24 Wi-Fi data points showing an amount of time connected to a Wi-Fi network per day. A WAI may then be calculated for the particular user based on the 24 non-outlier Wi-Fi data points, where the WAI shows the average amount of time per day the particular user is connected to the Wi-Fi network.

In some examples, the medium 212 may further include instructions to compare the WAI of a particular user of the plurality of users to the WAIs of additional users of the plurality of users. In some examples, comparing the WAI of a particular user to additional users may include determining that the particular user has a WAI value that is above the WAI values of the additional users. In some examples, comparing the WAI of a particular user to additional users may include determining that the particular user has a WAI value that is below the WAI values of the additional users. In some examples, comparing the WAI of a particular user to additional users may include determining that the particular user has a WAI value that is above the WAI values of some of the additional users but below the WAI values of other of the additional users.

The medium 212 may further include instructions to rate the Wi-Fi adoption of the particular user to the Wi-Fi adoption of the additional users. In some examples, the rating may be based on the comparison of the WAI of the particular user to the WAIs of the additional users. For example, the comparison of the WAI of the particular user to the WAIs of the additional users may indicate that the particular user has a higher WAI than each of the additional users. The particular user may then be rated as having effectively adopted Wi-Fi. In some examples, a WAI for a particular user that is higher than the WAIs of the additional user may indicate that Wi-Fi has been adopted effectively by the particular user, while a WAI for a particular user that is lower than the WAIs of the additional users may indicate that the ineffective adoption of Wi-Fi by the particular user.

Figure 3:
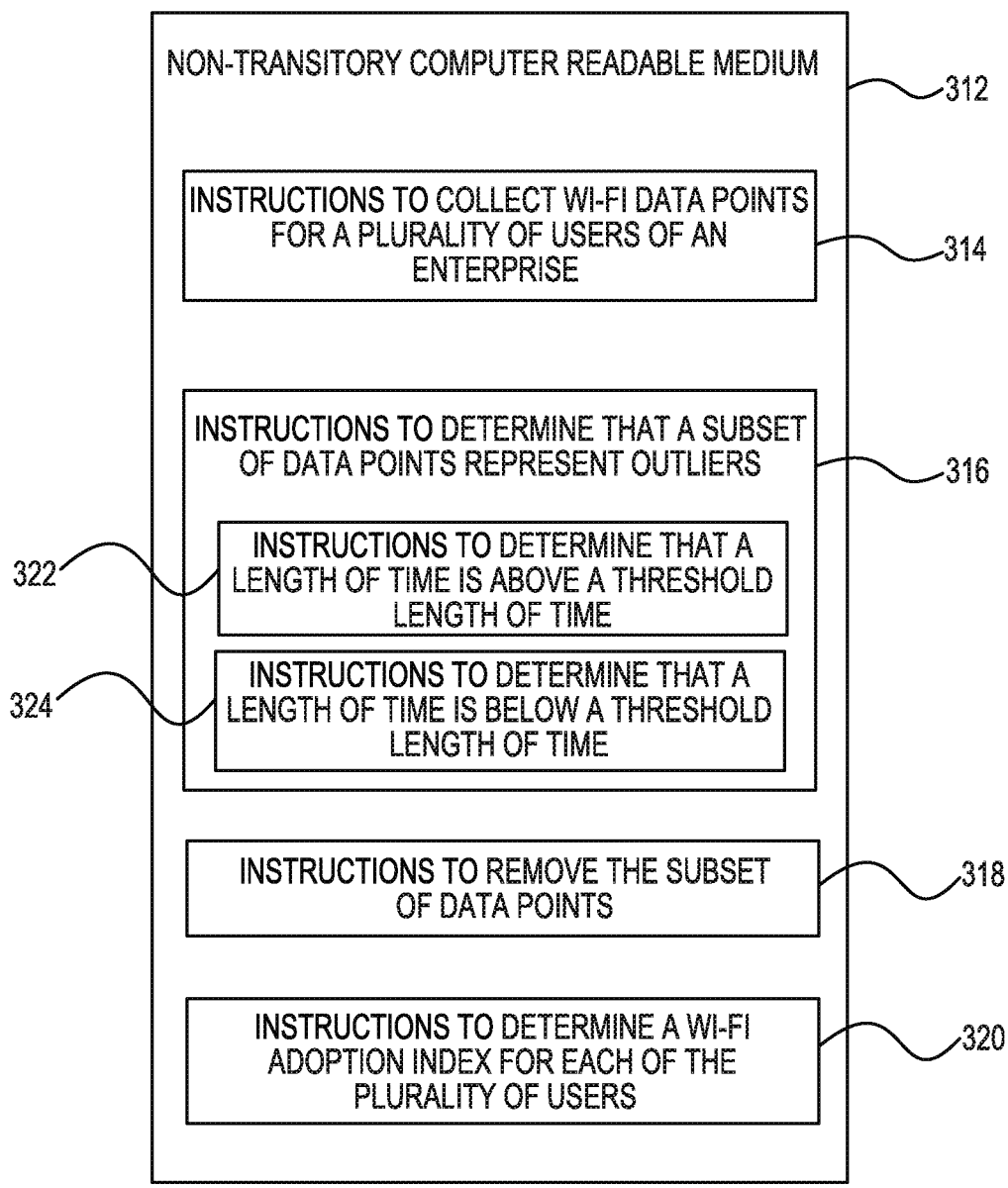
FIG. 3 illustrates another example of a medium for a Wi-Fi adoption index according to the disclosure.

FIG. 3 illustrates another example of a medium 312 for a Wi-Fi adoption index according to the disclosure. As shown in FIG. 3, medium 312 may include multiple components. Medium 312 may include a non-transitory computer-readable medium. Non-transitory computer-readable medium 312 may be akin to non-transitory computer-readable medium 212, discussed previously with respect to FIG. 2. Non-transitory computer-readable medium 312 may store instructions, such as instructions 314, 316, 318, 320, 322, and 324, which may be executed by a processing resource (not shown in FIG. 3).

The medium 312 may include instructions 314 executable by the processing resource to collect Wi-Fi data points for a plurality of users of an enterprise. Instructions 314 may be akin to instructions 214, discussed previously with respect to FIG. 2.

The medium 312 may include instructions 316 executable by the processing resource to determine that a subset of data points represent outliers. Said differently, instructions 316 may cause the processing resource to determine that a subset of the data points collected at 314 represent deviations. As shown in FIG. 3, instructions 316 may contain further instructions.

Instructions 316 may include instructions 322 to determine that a length of time is above a threshold length of time. Instructions 322 may include instructions determine that a plurality of data points correspond to a length of time connected to the Wi-Fi network that is above a first threshold length of time. For example, a Wi-Fi data point corresponding to a user running a program may indicate that the user was connected to the Wi-Fi network for twelve hours. The Wi-Fi data point corresponding to this user may be determined to represent an outlier because it falls above a first threshold period of time, such as six hours. In some examples, the first threshold period of time may be varied according to the Wi-Fi usage within an enterprise's Wi-Fi network. Said differently, a Wi-Fi network in which users tend to be connected for long periods of time may have a higher first threshold period of time for determining outliers than a Wi-Fi network in which users tend to be connected for short periods of time. In some examples, the first threshold period of time may be determined using a One Class Support Vector Machine algorithm (SVM), such as nu-SVM. In some examples, the first threshold period of time may be selected so that no more than 10% of the Wi-Fi data points exceed the threshold.

Instructions 316 may include instructions 324 to determine that a length of time is below a threshold length of time. Instructions 324 may include instructions to determine that a plurality of data point correspond to a length of time connected to the Wi-Fi network that is below a second threshold period of time. For example, a Wi-Fi data point may indicate that a user connected to the Wi-Fi network for five minutes. The Wi-Fi data point corresponding to this user may be determined to represent an outlier because it falls below a second threshold period of time, such as one hour. In some examples, the second threshold period of time may be varied according to the Wi-Fi usage within an enterprise's Wi-Fi network. Said differently, a Wi-Fi network in which users tend to be connected for short periods of time may have a lower second threshold period of time for determining outliers than a Wi-Fi network in which users tend to be connected for long periods of time. In some examples, the second threshold period of time may be determined using a One Class Support Vector Machine algorithm (SVM), such as nu-SVM. In some examples, the second threshold period of time may be selected so that no more than 10% of the Wi-Fi data points fall below the threshold.

The medium 312 may further include instructions 318 executable by the processing resource to remove the subset of data points. In some examples, instructions 318 may cause the processing resource to remove and discard the data points identified as outliers at 316. Instructions 318 may be akin instructions 218, described previously with respect to FIG. 2. In some examples, the subset of data points removed may be the data points identified in response to instructions 322 and/or instructions 324.

The medium 312 may include instructions 320 executable by the processing resource to determine a Wi-Fi Adoption Index (WAI) for each of the plurality of users. In some examples, instructions 320 may cause the processing resource to calculate a WAI for each of the plurality of the users. Instructions 320 may be akin to instructions 220, described previously with respect to FIG. 2. As described previously, the WAI may be calculated using the data set created at 318 by removing the subset of data points identified as outliers at 316.

The medium 312 may further include instructions executable by the processing resource to compare the WAI of a particular user of the plurality of users to the WAIs of additional users of the plurality of users. As described previously with respect to FIG. 2, comparing the WAI of a particular user of the plurality of users to the WAIs of additional users of the plurality of users may include determining that the WAI of the particular user is higher than, lower than, or equal to the WAIs of the additional users.

The medium 312 may further include instructions executable by the processing resource to rate the Wi-Fi adoption of the particular user to the Wi-Fi adoption of the additional users. In some examples, the rating may be based on the comparison of the WAI of the particular user to the WAIs of the additional users. As described previously with respect to FIG. 2, rating the Wi-Fi adoption of the particular user may indicate the effectiveness with which the user has adopted Wi-Fi.

Figure 4:
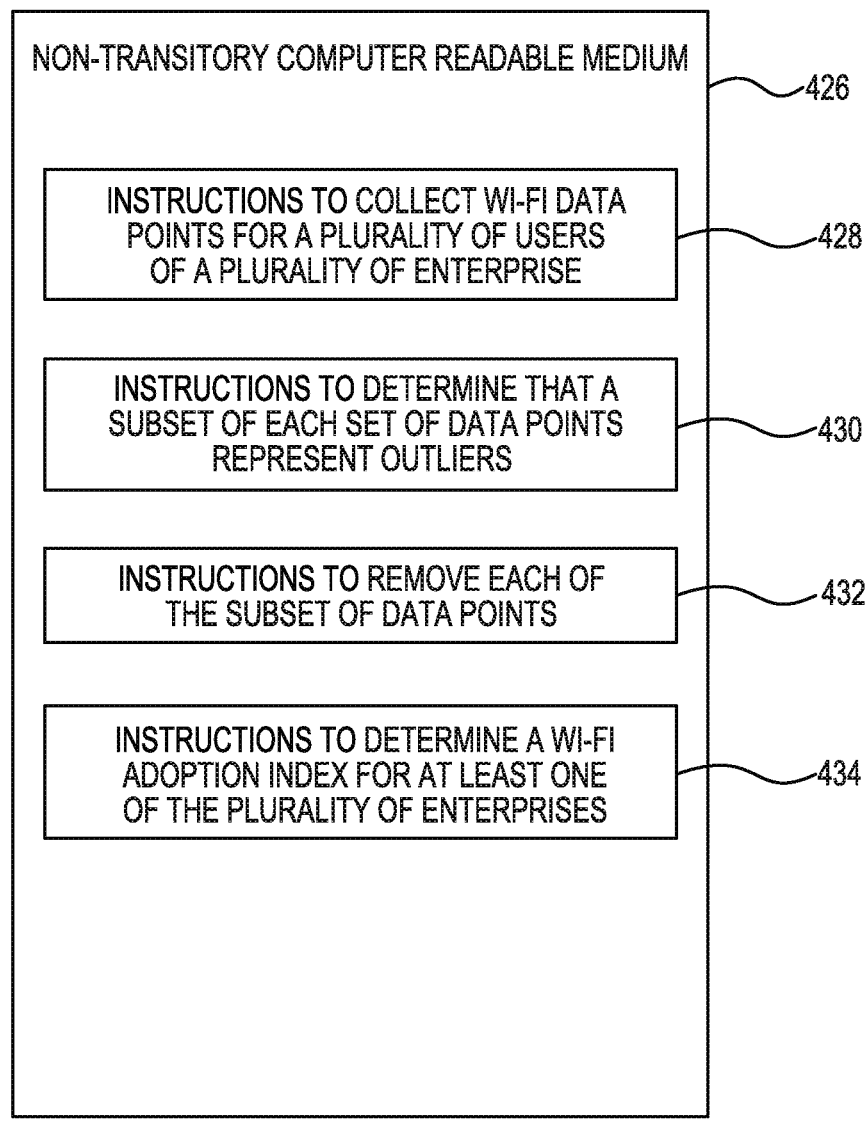
FIG. 4 illustrates another example of a medium for a Wi-Fi adoption index according to the disclosure

FIG. 4 illustrates another example of a medium 426 for a Wi-Fi adoption index according to the disclosure. As shown in FIG. 4, medium 426 may include multiple components. For example, medium 426 may include a non-transitory computer-readable medium. Non-transitory computer-readable medium 426 may be akin to non-transitory computer-readable mediums 212 and 312, shown in FIGS. 2 and 3, and discussed previously with respect to FIGS. 2 and 3. Non-transitory computer-readable medium 426 may store instructions, such as instructions 428, 430, 432, and 434, which may be executed by a processing resource (not shown in FIG. 4).

The medium 426 may include instructions 428 executable by the processing resource to collect sets of Wi-Fi data points for a plurality of users of a plurality of enterprises. In some examples, instructions 428 may cause the processing resource to determine that a user has accessed the Wi-Fi network and begin gathering data for the user. In some examples, the Wi-Fi data points may indicate a time at which a user first accessed a Wi-Fi network associated with at least one of the plurality of enterprises. In some examples, the Wi-Fi data points may further indicate a time at which a user terminated access to the Wi-Fi network. The Wi-Fi data points may then subtract the time at which a user first accessed the Wi-Fi network from the time at which the user terminated access to the Wi-Fi network to determine a time of stay. Said differently, the Wi-Fi data points may indicate the length of time a user was connected to and using the Wi-Fi network.

In some examples, each Wi-Fi data point may indicate which particular enterprise of the plurality of enterprises the Wi-Fi data point is associated with. For example, a user may connect to a Wi-Fi network associated with Enterprise A. The Wi-Fi data points collected while the user is connected to the Wi-Fi network may indicate that they correspond to Enterprise A. In some examples, the indicator of the particular enterprise of the plurality of enterprises may allow instructions 428 to sort the Wi-Fi data points into sets. In some examples, each set may correspond to a particular enterprise of the plurality of enterprises. For example, Set A may correspond to Enterprise A, Set B may correspond to Enterprise B, and so on.

The medium 426 may include instructions 430 executable by the processing resource to determine that a subset of each set of data points represent outliers. Said differently, instructions 430 may cause the processing resource to determine that a subset of each of the sets of Wi-Fi data points collected at 428 represent deviations. In some examples, instructions 430 may include instructions to determine that a first plurality of data points indicate an amount of time connected that is above a threshold amount of time. For example, a Wi-Fi data point corresponding to a user running a program may indicate that the user was connected to the Wi-Fi network for twelve hours. The Wi-Fi data point corresponding to this user may be determined to represent an outlier because it falls above a first threshold period of time, such as six hours. In some examples, the first threshold period of time may be varied according to the Wi-Fi usage within an enterprise's Wi-Fi network. Said differently, a Wi-Fi network in which users tend to be connected for long periods of time may have a higher first threshold period of time for determining outliers than a Wi-Fi network in which users tend to be connected for short periods of time. In some examples, the first threshold period of time may be selected so that no more than 10% of the Wi-Fi data points exceed the threshold. The first threshold may be different for each of the plurality of enterprises and be based on characteristics of an individual enterprise. Further, each set of Wi-Fi data points may have outliers determined individually, i.e., each set of Wi-Fi data points may be separately analyzed.

Instructions 430 may include instructions to determine that a plurality of data points correspond to a length of time connected to the Wi-Fi network that is below a second threshold period of time. For example, a Wi-Fi data point may indicate that a user connected to the Wi-Fi network for five minutes. The Wi-Fi data point corresponding to this user may be determined to represent an outlier because it falls below a second threshold period of time, such as one hour. In some examples, the second threshold period of time may be varied according to the Wi-Fi usage within an enterprise's Wi-Fi network. Said differently, a Wi-Fi network in which users tend to be connected for short periods of time may have a lower second threshold period of time for determining outliers than a Wi-Fi network in which users tend to be connected for long periods of time. In some examples, the second threshold period of time may be selected so that no more than 10% of the Wi-Fi data points fall below the threshold. The second threshold may be different for each of the plurality of enterprises and may be based on the characteristics of an individual enterprise. Further, each set of Wi-Fi data points may have outliers determined individually, i.e., each set of Wi-Fi data points may be separately analyzed.

The medium 426 may include instructions 432 executable by the processing resource to remove each of the subset of data points. In some examples, instructions 432 may cause the processing resource to discard the subsets of data points identified as outliers at 430. Instructions 432 may be akin to instructions 218 and 318, shown in FIGS. 2 and 3, and discussed previously with respect to FIGS. 2 and 3. In some examples, each individual set of Wi-Fi data points may have outliers identified at 430, such that each individual set of Wi-Fi data points may have its respective outliers removed at 432. In some examples, instructions 432 may create a data set comprised of non-outlier data points. Each individual enterprise may have a corresponding data set, i.e., Data Set A corresponding to Enterprise A, Data Set B corresponding to Enterprise B, and so on.

The medium 426 may include instructions 434 executable by the processing resource to determine a Wi-Fi Adoption Index (WAI) for at least one of the plurality of enterprises. In some examples, the WAI may indicate how a particular enterprise has adopted Wi-Fi. A WAI may be calculated for a particular enterprise based on the particular enterprise's corresponding data set. For example, a WAI may be calculated for Enterprise A based on Data Set A. In some examples, a WAI may be calculated by averaging the values of the Wi-Fi data points in a data set. For example, a data set may include Wi-Fi data points indicating an amount of time a user was connected to a particular enterprise's Wi-Fi network. A WAI may be computer by averaging the amounts of time. In such examples, the WAI may describe an average amount of time a user is connected to the Wi-Fi network of the particular enterprise.

The medium 426 may further include instructions executable by the processing resource to compare the WAI of a particular enterprise to a number of WAIs of the plurality of enterprises. In some examples, the instructions to compare the WAI of a particular enterprise to a number of WAIS of the plurality of enterprises may include instructions to determine that an additional enterprise shares a number of characteristics with the particular enterprise. For example, characteristics such as size, number of employees, number of computers, or number of visitors may be evaluated for both the particular enterprise and the additional enterprise. In some examples, the additional enterprise may be determined to share a number of characteristics with the particular enterprise that is above a threshold number of characteristics. Based on this determination, the additional enterprise may be selected for comparison to the particular enterprise.

The medium 426 may further include instructions executable by the processing resource to rate the Wi-Fi adoption of the particular enterprise to the Wi-Fi adoption of the plurality of enterprises. In some examples, the rating may be based on the comparison of the WAI of the particular enterprise to the WAIs of the plurality of enterprises. For example, the comparison of the WAI of the particular enterprise to the WAIs of the plurality of enterprises may indicate that the particular user has a higher WAI than each of the plurality of enterprises. The particular enterprise may then be rated as having effectively adopted Wi-Fi. In some examples, a WAI for a particular enterprise that is higher than the WAIs of the plurality of enterprises may indicate that Wi-Fi has been adopted effectively by the particular enterprise, while a WAI for a particular enterprise that is lower than the WAIs of the plurality of enterprises may indicate ineffective adoption of Wi-Fi by the particular enterprise.

Figure 5:
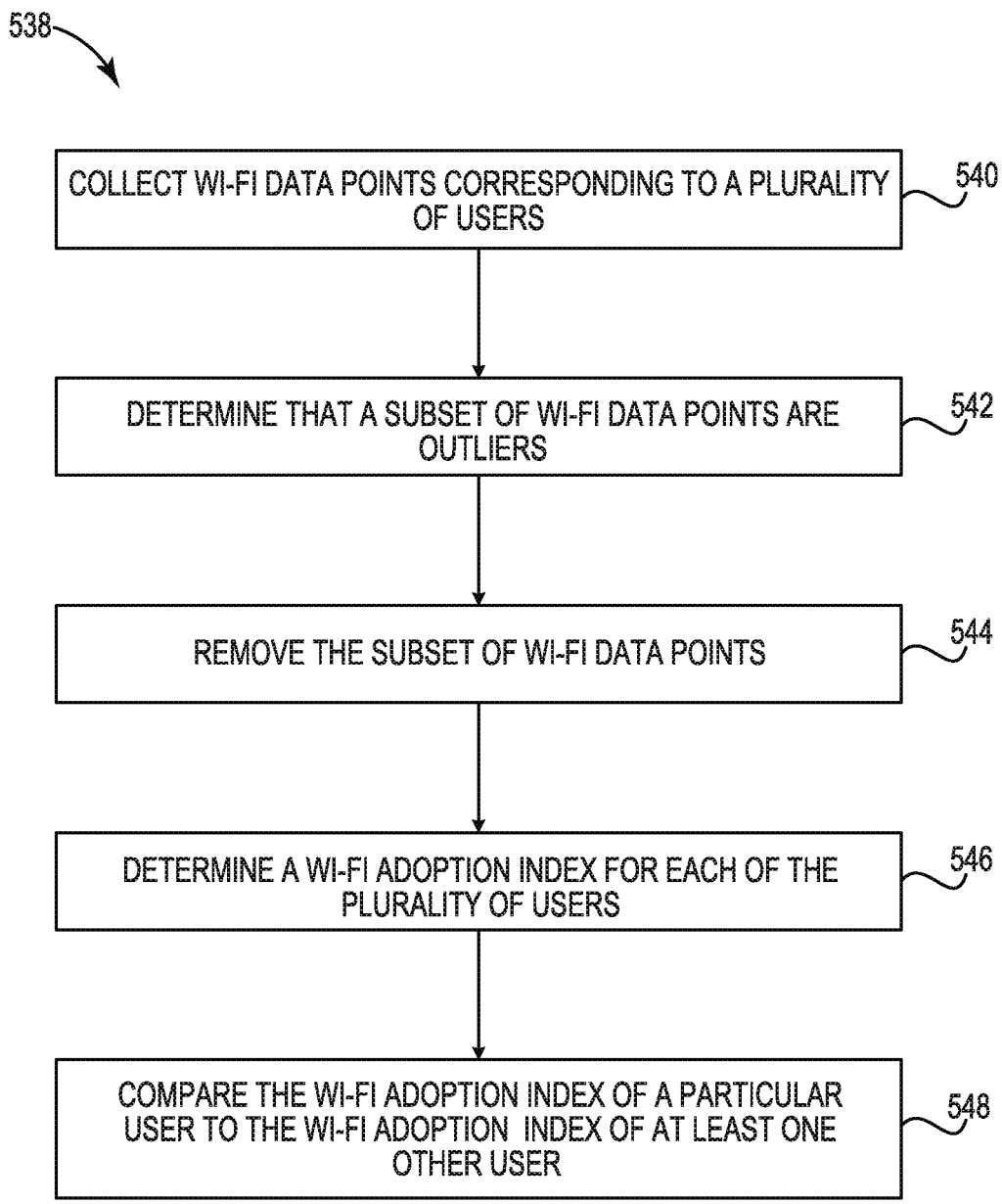
FIG. 5 illustrates an example of a method for a adoption index according to the disclosure.

FIG. 5 illustrates an example of a method 538 for a Wi-Fi adoption index according to the disclosure. At 540, method 538 may include collecting Wi-Fi data points corresponding to a plurality of users. As previously discussed, Wi-Fi data points may be collected beginning when a user connects to a Wi-Fi network and may be collected until the user disconnects from the Wi-Fi network. In some examples, the Wi-Fi data points may represent an amount of time each user of a plurality users is connected to the Wi-Fi network. Collecting Wi-Fi data points at 540 may correspond to collect Wi-Fi data points instructions 214, 314, and/or 428, shown in FIGS. 2, 3, and 4.

At 542, method 538 may include determining that a subset of Wi-Fi data points are outliers. In some examples, determining that a subset of Wi-Fi data points are outliers may include determining that a first plurality of the Wi-Fi data points corresponds to an amount of time connecting that is above a threshold amount of time connected. In some examples, determining that a subset of the Wi-Fi data points are outliers may include determining that a second plurality of the Wi-Fi data points corresponds to an amount of time connected that is below a threshold amount of time connected. Determining that a subset of Wi-Fi data points are outliers at 542 may correspond to instructions 216, 316, and/or 430, shown in FIGS. 2, 3, and 4.

At 544, method 538 may include removing the subset of Wi-Fi data points. In some examples, the subset of Wi-Fi data points to be removed at 544 may correspond to the Wi-Fi data points identified as outliers at 542. Removing the subset of Wi-Fi data points at 544 may further include creating a data set. In some examples, the data set may comprise non-outlier data points. Removing the subset of Wi-Fi data points at 544 may correspond to instructions 218, 318 and/or 432, shown in FIGS. 2, 3, and 4.

At 546, method 538 may include determining a Wi-Fi Adoption Index (WAI) for each of the plurality of users. In some examples, a WAI may be determined based on the data set created at 544. In some examples, the WAI may be determined by taking an average of the data points within the data set. In such examples, the WAI may indicate an average amount of time each user of the plurality of users is connected to the Wi-Fi network. In some examples, a WAI may be determined for the enterprise overall, as opposed to a particular user. In such examples, the WAI may be determined by taking an average of the data points within the data set, indicating an average amount of time the plurality of users is connected to the Wi-Fi network of the enterprise. Determining a WAI at 546 may correspond to instructions 220, 320, and/or 434, shown in FIGS. 2, 3, and 4.

At 548, method 538 may include comparing the Wi-Fi Adoption Index (WAI) of a particular user to the Wai of at least one other user. In some examples, comparing the WAI of a particular user to the WAI at least one other user may include determining that the particular user has a WAI value that is above the WAI value of the at least one other user. In some examples, comparing the WAI of a particular user to the WAI of at least one other user may include determining that the particular user has a WAI value that is below the WAI values of the at least one other user. In some examples, comparing the WAI of a particular user to the WAI at least one other user may include determining that the particular user has a WAI value that is above the WAI values of some of the other users but below the WAI values of some of the other users.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to any number of such elements and/or features.

What is claimed:

1. A non-transitory computer-readable medium containing instructions executable by a processing resource to:
   collect Wi-Fi data points corresponding to a plurality of users of an enterprise for a particular number of days, wherein the Wi-Fi data points indicate a time period during each of the particular number of days when each of the plurality of users was connected to a Wi-Fi network;
   determine that a subset of the Wi-Fi data points represent outliers;
   remove the subset of Wi-Fi data points to create a data set, wherein the data set comprises non-outlier Wi-Fi data points; and
   determine a Wi-Fi Adoption Index (WAI) for each of the plurality of users based on the data set, wherein the WAI for each user indicates an extent of Wi-Fi usage by the user within the enterprise.

2. The non-transitory computer-readable medium of claim 1, further comprising instructions executable by the processing resource to:
   compare the WAI of a particular user of the plurality of user to the WAIs of additional users of the plurality of users; and
   rate the Wi-Fi adoption of the particular user to the Wi-Fi adoption of the additional users based on the comparison.

3. The non-transitory computer-readable medium of claim 1, wherein the instructions to collect Wi-Fi data points include instructions to:
   collect data indicating a length of time at least one of the plurality of users is connected to the Wi-Fi network; and
   collect data indicating a time of day during which at least one of the users is connected to the Wi-Fi data network.

4. The non-transitory computer-readable medium of claim 1, wherein the instructions to determine that a subset of the Wi-Fi data points are outliers comprises instructions to determine that a length of time the at least one of the plurality of users is connected to the Wi-Fi network is above a first threshold length of time.

5. The non-transitory computer-readable medium of claim 1, wherein the instructions to determine that a subset of the Wi-Fi data points are outliers comprises instructions to determine that a length of time the at least one of the plurality of users is connected to the Wi-Fi network is below a second threshold length of time.

6. A non-transitory computer-readable medium containing instructions executable by a processing resource to:
  collect sets of Wi-Fi data points corresponding to a plurality of users of a plurality of enterprises for a particular number of days, wherein each of the sets of Wi-Fi data points indicate an amount of time during which the plurality of users associated with each of the plurality of enterprises are connected to a Wi-Fi network of each of the plurality of enterprises;
  determine that a subset of each set of the Wi-Fi data points are outliers;
  remove each of the subsets of Wi-Fi data points to create a data set corresponding to each of the plurality of enterprises, wherein the data sets comprise non-outlier Wi-Fi data points; and
  determine a Wi-Fi Adoption Index (WAI) for at least one of the plurality of enterprises based on the data sets.

7. The non-transitory computer-readable medium of claim 6, further comprising instructions executable by the processing resource to:
  compare the WAI of a particular enterprise to a number of WAIs of the plurality of enterprises; and
  rate the Wi-Fi adoption of the particular enterprise to the Wi-Fi adoption of the plurality of enterprises based on the comparison.

8. The non-transitory computer-readable medium of claim 7, wherein the instructions to compare the WAI of the particular enterprise to a number of WAIs of the plurality of enterprises comprises instructions to:
  determine that an additional enterprise shares a number of characteristics with the particular enterprise that is above a threshold number of characteristics; and
  select the additional enterprise for comparison to the particular enterprise.

9. The non-transitory computer-readable medium of claim 6, wherein the instructions to determine that a subset of the data points are outliers comprise instructions to determine that a first plurality of data points indicate that an amount of time during which the plurality of users are connected to a Wi-Fi network of at least one of the plurality of enterprises is above a first threshold time period.

10. The non-transitory computer-readable medium of claim 6, wherein the instructions to determine that a subset of the data points are outliers comprise instructions to determine that a second plurality of data points indicate that an amount of time during which the plurality of users are connected to a Wi-Fi network of at least one of the plurality of enterprises is below a second threshold time period.

11. A method, comprising:
  collecting Wi-Fi data points corresponding to a plurality of users of a Wi-Fi network within an enterprise for a particular number of days, wherein the Wi-Fi data points represent an amount of time each of the plurality of users is connected to the Wi-Fi network;
  determining that a subset of the Wi-Fi data points are outliers;
  removing the subset of Wi-Fi data points to create a data set, wherein the data set comprises non-outlier Wi-Fi data points;
  determining a Wi-Fi Adoption Index (WAI) for each of the plurality of users based on the data set; and
  comparing the WAI of a particular user of the plurality of users to the WAI of at least one other user of the plurality of users.

12. The method of claim 11, further comprising determining a WAI for the enterprise based on the data set.

13. The method of claim 11, wherein determining that a subset of the Wi-Fi data points are outliers comprises:
  determining that a first plurality of the Wi-Fi data points corresponds to an amount of time connected that is above a first threshold amount of time connected; and
  determining that a second plurality of the Wi-Fi data points corresponds to an amount of time connected that is below a second threshold amount of time connected.

14. The method of claim 11, wherein determining a WAI comprises taking an average of the data points within the data set.

15. The method of claim 14, wherein the WAI indicates an average amount of time a user is connected to the Wi-Fi network within the enterprise.

* * * * *